(12) United States Patent
Tysowski et al.

(10) Patent No.: US 7,730,028 B2
(45) Date of Patent: Jun. 1, 2010

(54) SCHEMA UPDATING FOR SYNCHRONIZING DATABASES CONNECTED BY WIRELESS INTERFACE

(75) Inventors: Piotr K. Tysowski, Waterloo (CA); Darrell R. May, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 173 days.

(21) Appl. No.: 11/534,239

(22) Filed: Sep. 22, 2006

(65) Prior Publication Data

US 2008/0077632 A1    Mar. 27, 2008

(51) Int. Cl.
G06F 17/30    (2006.01)
G06F 17/00    (2006.01)

(52) U.S. Cl. ............... 707/610; 709/219; 455/412.1
(58) Field of Classification Search ......... 707/100–102; 455/412
See application file for complete search history.

(56) References Cited

U.S. PATENT DOCUMENTS

| 6,321,236 | B1 * | 11/2001 | Zollinger et al. ............ 707/203 |
| 7,263,551 | B2 * | 8/2007 | Belfiore et al. ............. 709/219 |
| 7,317,907 | B2 * | 1/2008 | Linkert et al. ............ 455/412.1 |
| 2003/0115548 | A1 | 6/2003 | Melgar |
| 2004/0194016 | A1 | 9/2004 | Liggitt |
| 2004/0224675 | A1 | 11/2004 | Puskoor et al. |
| 2005/0071344 | A1 | 3/2005 | Chen et al. |
| 2005/0120123 | A1 | 6/2005 | Huang et al. |

OTHER PUBLICATIONS

Meisti et al, "X-Evolution: A System for XML Schema Evolution and Document Adaptation", Mar. 31, 2006, XP19029256.
First European Examination Report, European Patent Office, Dec. 4, 2006.
Ipulse, European Patent Agents, Response to First European Examination Report of Feb. 3, 2007 and copies of amended claims.
Second European Examination Report, European Patent Office, May 8, 2007.
Ipulse, European Patent Agents, Response to Second Examination European Report of May 8, 2007 and copies of amended claims.
Third European Examination Report, European Patent Office, May 29, 2008.
Ronstrom, Mikael, "Design and Modelling of a Parallel Data Server for Telecom Applications", Dec. 31, 1997.

* cited by examiner

*Primary Examiner*—Yicun Wu
(74) *Attorney, Agent, or Firm*—Perry + Currier Inc.

(57) ABSTRACT

A method of updating a database, including data records, to accord with an updated schema. The method includes obtaining, at a portable electronic device, the updated schema associated with the database. If a field is deleted in the updated schema, the data records are updated by deleting the field from each of the data records. An update command is transmitted from the portable electronic device for updating the database schema for a corresponding backup database at a server.

26 Claims, 4 Drawing Sheets

SCHEMA UPDATING FOR SYNCHRONIZING DATABASES CONNECTED BY WIRELESS INTERFACE

FIELD

The present application relates to database schema updating for synchronization of data at a portable electronic device with data embodied at a communication network.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS and CDMA2000 networks.

These portable electronic devices commonly include databases for storing data that is selectably retrievable by a user of a device. The data forms a series of data records, each data record containing one or more fields, each data record belonging to a database on the portable electronic device. During operation of the device, the data is retrieved and displayed, or otherwise made available to the user. The data can be modified, added to or deleted by the user of the device.

Advances in data storage have accompanied advances in portable electronic devices to provide for backup of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station. Other portable electronic devices provide for backup of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station.

Database schemas are statically defined as Extensible Markup Language (XML) files. These database schemas define the tables (types of records) and for each type of record, include information relating to each field. The information relating to each field includes, for example, the field name for each field, a tag number, a data type, a maximum supported length and an indication as to whether or not the field is a key field is included for each field of a type of record in a database schema. The database schema is changed for any change in structure of any database records. With a change in a database schema, data records of a database that do not conform to the new database structure defined by the new database schema, are invalidated and are permanently deleted. Thus, any change in a database schema at, for example, a portable electronic device, results in the invalidation of an entire backup database of records at, for example, a computing station. New database records are then stored that conform to the new database schema. This occurs even with a simple modification of a single field in a database schema. This is clearly inefficient, particularly where database backup occurs over the air (by radio communication) as backup of all records of a database can be time consuming and costly to a user paying for the service.

BRIEF DESCRIPTION OF THE DRAWINGS

A method and apparatus for schema updating for synchronization of databases connected by wireless interface will be better understood with reference to the following description and to the Figures, in which.

DETAILED DESCRIPTION OF THE EMBODIMENT

Figure 1:
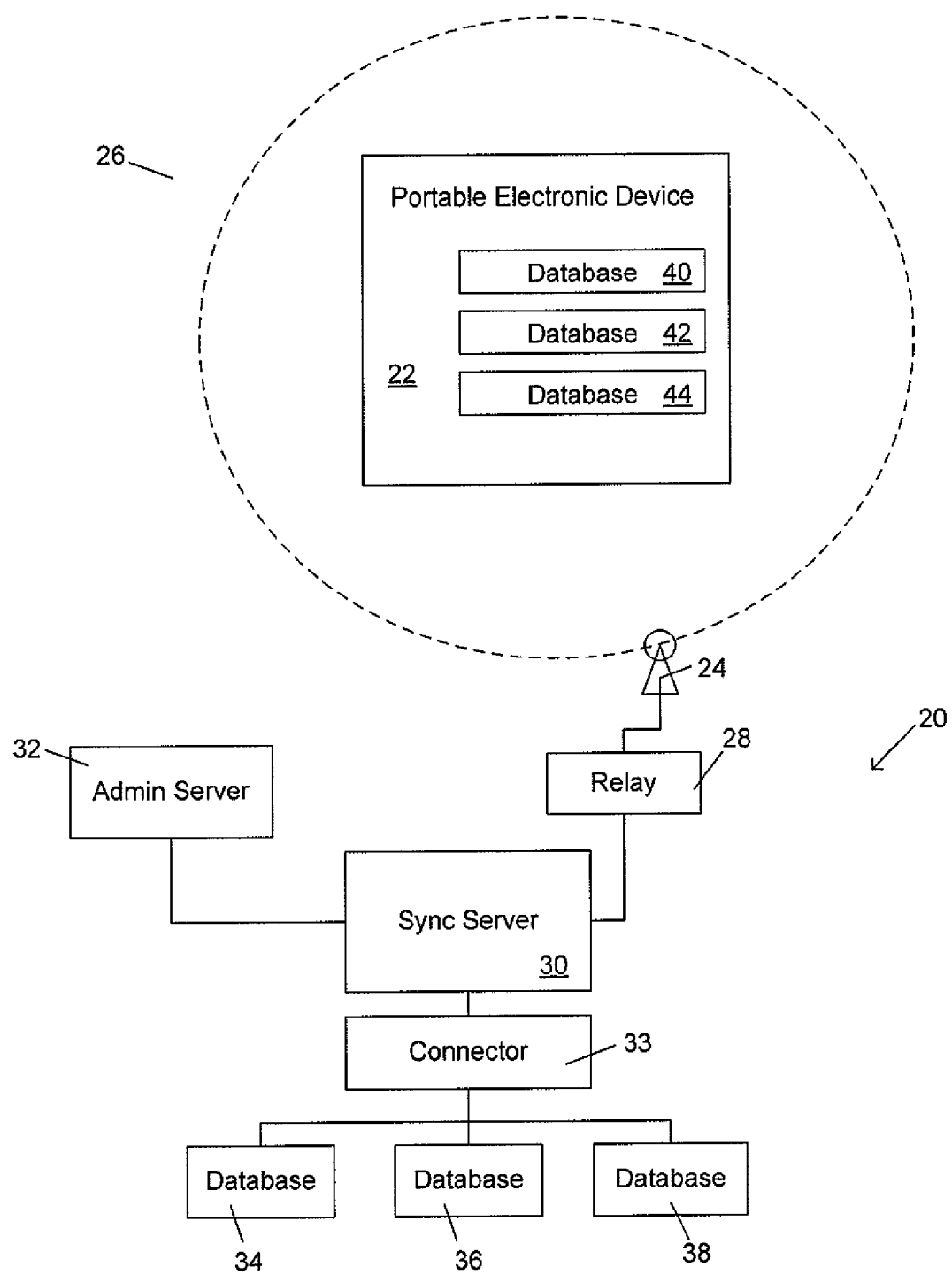
FIG. 1 is a functional block diagram of an exemplary radio communication system including a portable electronic device and a communication system having a synchronization server.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communication system 20 is functionally represented in FIG. 1 and a single base station 24 is shown. The base station 24 defines a coverage area, or cell 26 within which communications between the base station 24 and the portable electronic device 22 can be effectuated. It will be appreciated that the portable electronic device 22 is movable within the cell 26 and can be moved to coverage areas defined by other cells that are not illustrated in the present example. The communication system 20 includes a relay device 28 that is connected to the base station 24 and to a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is also functionally coupled through a personal information management connector 33 to databases, of which, three exemplary database types including a database 34, a database 36, and a database 38 are shown. The personal information management connector 33 interfaces between the synchronization server 30 and the databases 34, 36, 38. It will be understood that the personal information management connector 33 is a functional component and can be provided by way of an application on the synchronization server 30. The databases of the present example are of a text format such as an Extensible Markup Language (XML) format. The data maintained in the first, second, and third databases 34, 36, 38 includes a number of data records, each data record containing a plurality of fields that are populated with data.

The portable electronic device 22, of which only particular functional portions are shown in FIG. 1 for the purposes of the present description, includes a plurality of databases 40, 42, 44 that correspond to the databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
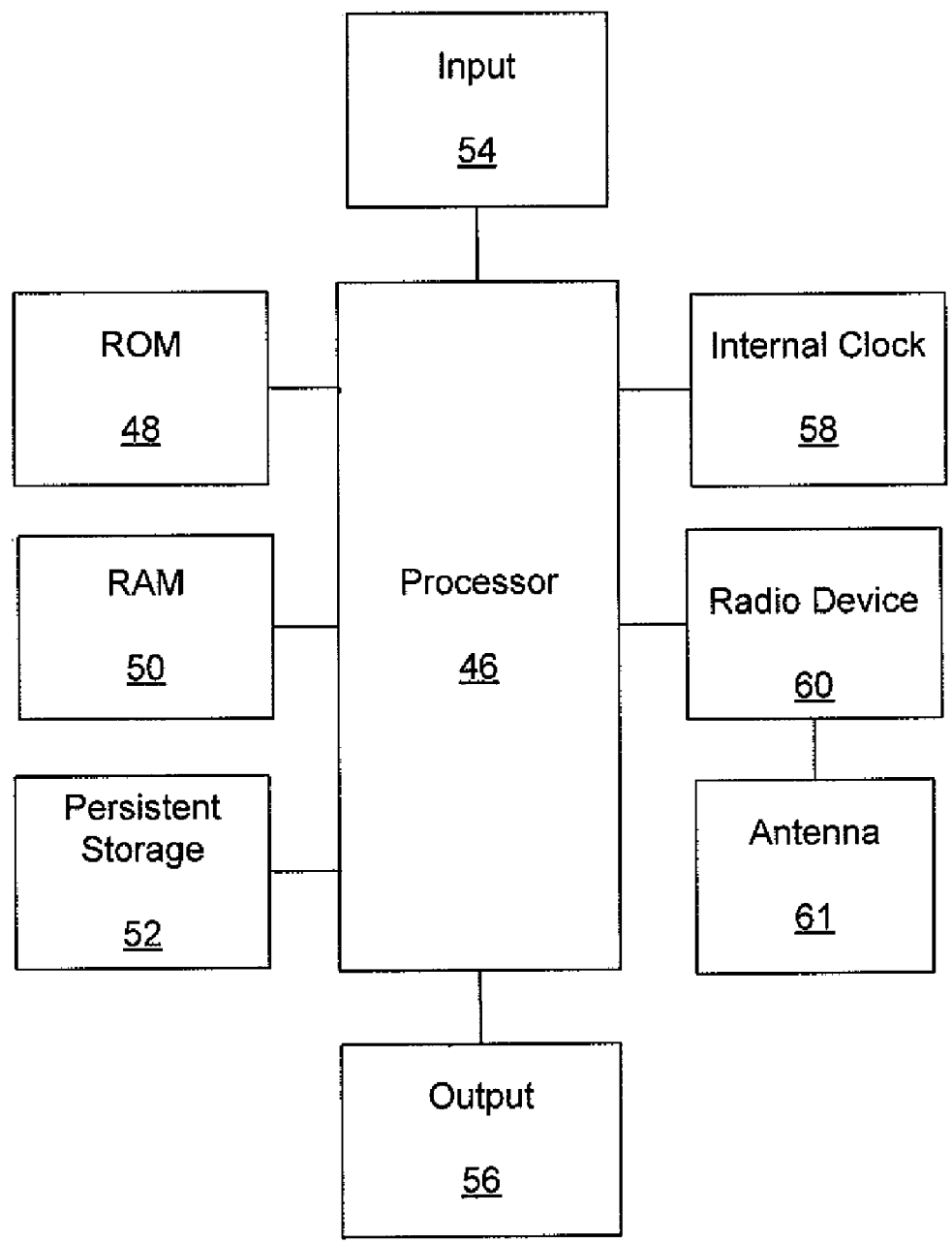
FIG. 2 is a block diagram of certain internal components within the portable electronic device of FIG. 1.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. For example, a synchronization agent is provided for interfacing between the synchronization server 30 and the portable electronic device 22. The processor 46 is also connected to a random access memory (RAM) unit 50 and a persistent storage device 52 which are responsible for various non-volatile storage functions of the portable electronic device 22 and in which the databases 40, 42, 44 are maintained. Each of the databases 40, 42, 44 are registered for synchronization with the synchronization agent upon start up of the portable electronic device 22. The processor 46 receives input from input devices 54 such as a keyboard. The processor 46 outputs to output devices 56 such as an LCD display. The processor 46 is also connected to an internal clock 58 and to a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46. For example, the processor 46 of the portable electronic device 22 is operable to obtain an updated database schema and to store the updated database schema at the persistent storage device 52, in a data dictionary associated with the database to which the database schema belongs. The portable electronic device 22 is also operable to retrieve a previous database schema from memory, to compare the updated database schema with the previous database schema and to generate an update command based on the comparison. The portable electronic device 22 is further operable to update the records of the database at the portable electronic device 22 and to transmit the update command to the communication system 20.

Figure 3:
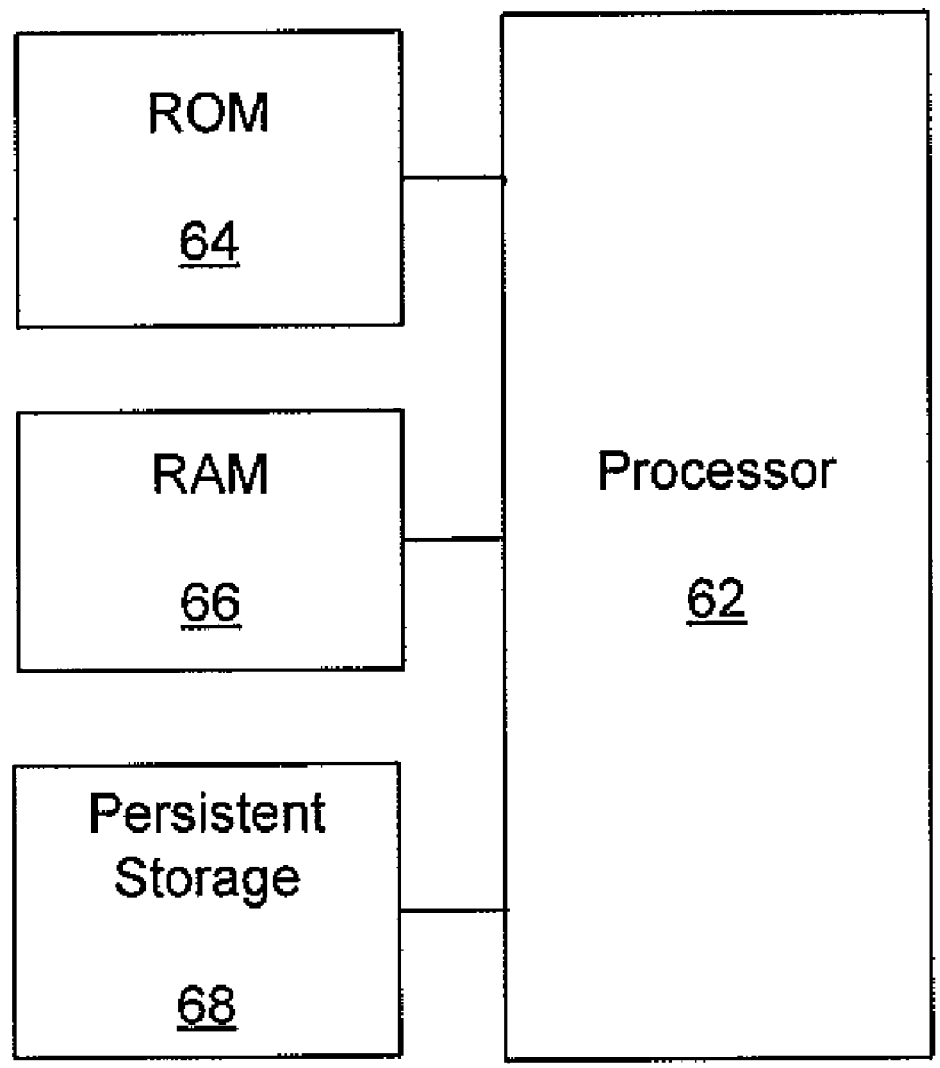
FIG. 3 is a block diagram of certain internal components within the synchronization server of FIG. 1.

Reference is now made to FIG. 3 which shows a block diagram of certain internal components within the synchronization server 30. Similar to the portable electronic device 22, the synchronization server 30 includes a processor 62 connected to a read-only memory (ROM) 64 that includes applications executable by the processor 62 and enables the synchronization server 30 to perform certain functions including synchronization with the portable electronic device 22. The processor 62 is also connected to a random access memory (RAM) unit 66 and a persistent storage device 68 which are responsible for various non-volatile storage functions of the synchronization server 30. The processor 62 is functionally connected to the databases 34, 36, 38 through the personal information management connector 33 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to receive communications generated by the portable electronic device including the update command. The synchronization server 30 is further operable to request data records from the personal information management connector 33, to update the data records based on the update command, and to store the updated database records in the database to which the updated database records belong.

Database schemas are defined as Extensible Markup Language (XML) files that are passed from the synchronization server 30 to the portable electronic device 22, through the relay 28 and the base station 24 during an initial handshake for synchronization of one of the databases 40, 42, 44 of the portable electronic device 22 with the corresponding one of the databases 34, 36, 38 at the communication system 20. It will be appreciated that each of the databases 40, 42, 44 has an associated schema that defines the structure for the data records of that database. Thus, the schema defines the field name, tag identification number, data type, maximum supported length, whether or not the field is a key field and whether or not the field is supported for synchronization, for each field of the data records of the associated database.

Changes to the database schema are possible. For example, changes can be made to delete a field, add a new field or modify an existing field, programmatically. Such programmatic changes are made by, for example, downloading an updated version of software to the portable electronic device 22 by wire (serial) connection to a computing device, including an updated database schema. It is possible that changes can be made by other means, for example, via the user interface of the portable electronic device 22.

Figure 4:
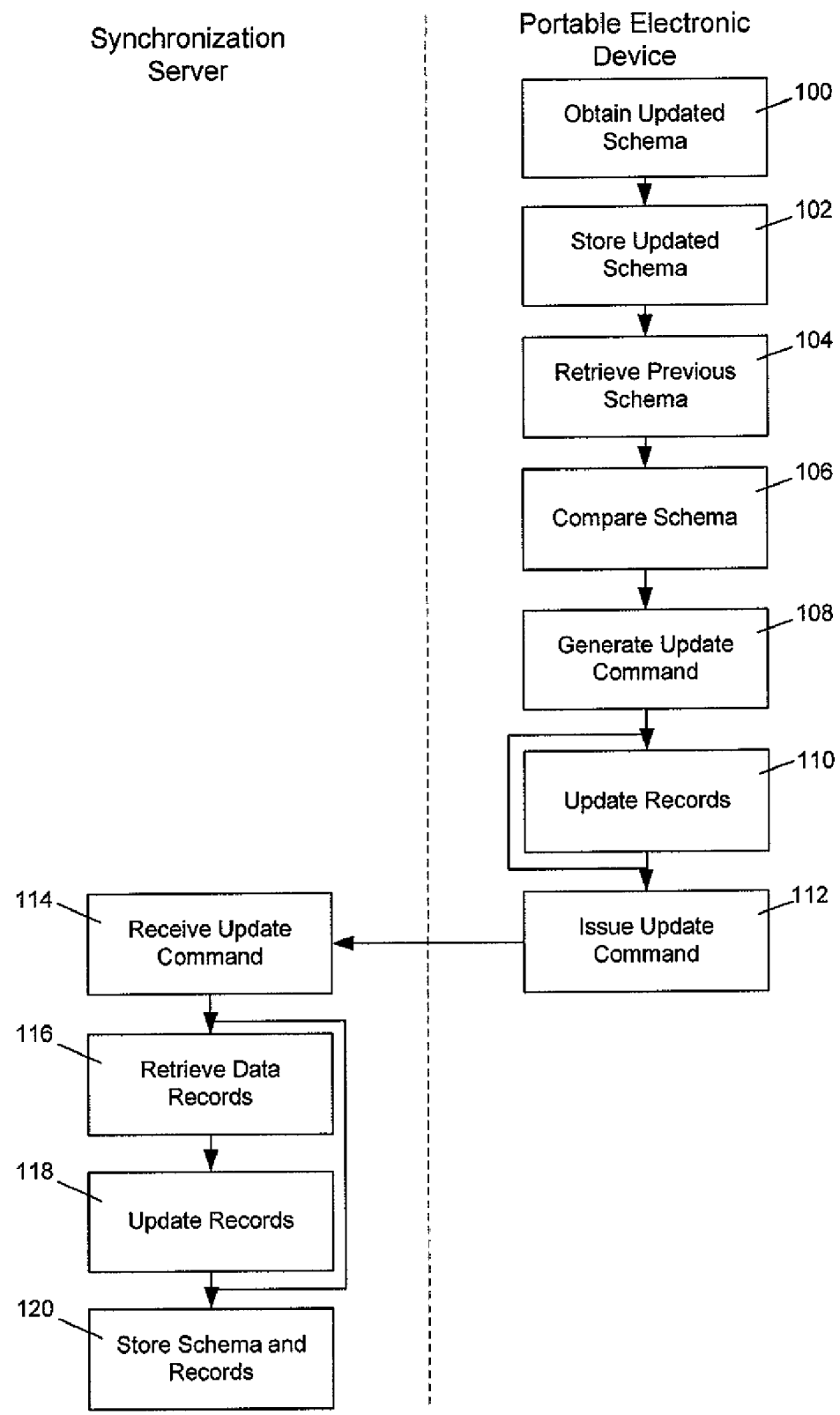
FIG. 4 is a sequence diagram illustrating functions carried out at both the portable electronic device and the communication system of FIG. 1 during schema updating according to one embodiment.

Referring now to FIG. 4, a method for updating databases, including data records, to accord with the updated database schema will now be described. The updated database schema is first obtained at the portable electronic device 22 for one of the databases 40, 42, 44 at step 100. The updated database schema includes changes made by any suitable means, such as changes made programmatically to the database schema. Upon receipt of the updated database schema, the portable electronic device 22 stores the schema at the persistent storage device 52 in a data dictionary in association with the one of the databases 40, 42, 44 to which the updated database schema belongs (step 102). Next the portable electronic device 22 retrieves the previous database schema that is associated with the same one of the databases 40, 42, 44 to which the updated database belongs, from the persistent storage device 52 at step 104. A comparison of the updated database schema to the previous database schema is then carried out at the portable electronic device at step 106. From the comparison of the updated database schema with the previous database schema, an update command is generated in cases where the updated schema differs from the previous database schema (step 108). Thus, the changes made to the schema are determined by the comparison at step 108, and these changes are used in an update command for updating the records of the associated database. The changes to the database schema take the form of a deletion, an addition or modification of a field of data. If the changes to the database schema include the deletion of a field, the records of the associated one of the databases 40, 42, 44 at the portable electronic device 22 are then updated at step 110. Thus, a field that is made obsolete and removed from synchronization is deleted from all of the records of the associated database. Therefore the records of the associated database conform to the new database schema. If the changes to the database schema include the modification of a field, the records of the associated one of the databases 40, 42, 44 at the portable electronic device 22 are updated at step 110. The records are updated by deleting the data in the modified field. Any new data to be added to the field must conform to the new database schema and is added by, for example, user entry at the input devices 54 of the portable electronic device 22. Of course, the data can also be added to the modified field in a synchronization operation. If a new field is added to the updated schema, the new field is added in the update command. The records of the database, however, are not changed until data is entered for the new field by, for example, user entry at the input devices 54 of the portable electronic device 22. After updating the records of the associated one of the databases 40, 42, 44, the portable electronic device 22 issues the update command to the server 30 for updating the database schema by transmitting the command over radio interface to the server 30 through the base station 24 and relay 28 (step 112).

The server 30 receives the update command for updating the database schema at step 114. The records of the associated one of the backup databases 34, 36, 38 are updated similarly to the updates made to the records of the associated one of the databases 40, 42, 44 at the portable electronic device 22. Thus, if the changes to the database schema include the deletion of a field or the modification of a field, the records of the associated one of the backup databases 34, 36, 38 are retrieved through the connector 33 at step 116. The records of the associated one of the backup databases 34, 36, 38 are then updated to accord with the updated database schema, using the update command (step 118). With the deletion of a field in the database schema, data in that field is deleted from all of the records of the associated database at step 118. Thus, the data records of the associated database all conform to the updated database schema. With the modification of a field, the records of the associated one of the databases 34, 36, 38 are updated by deleting the data in the modified field at step 118. With the modification of a field, however, the field is not deleted from the database schema and thus, when data is entered into the field of a record at the portable electronic device 22 and the record is stored in the appropriate database, the data is sent to the server 32 as part of a regular data record backup operation, for storage in the appropriate database at the communication system 20 side. If a new field is added to the updated schema, the records of the associated one of the databases 34, 36, 38 are not retrieved and are not changed until data is entered for the new field by, for example, user entry at the input devices 54 of the portable electronic device 22, followed by a backup operation to send the data to the server 32. The updated database schema and updated records are then stored in the associated one of the backup databases 34, 36, 38, from which they were retrieved (step 120).

The following examples are provided to further illustrate various aspects of embodiments. These examples are intended to be illustrative only and are not intended to limit the scope of the present application.

In the present example, a field of the records in the database 42 is made obsolete and removed from synchronization. One of the e-mail fields in the records of an address database (for example, Contacts records) is made obsolete and therefore is removed from synchronization. The updated schema is received in the form of an XML file that has one less field defined therein as compared to the previous schema for the database 42 (step 100). The updated schema includes the updated database structure and includes a mapping between the field tags of the updated schema and the field tags of the Messaging Application Programming Interface (MAPI). The updated database schema for the database 42 is stored at the persistent storage device 52, in the data dictionary in association with the database 42 (step 102). The previous schema for the address database 42 is then retrieved from the persistent storage device 52 (step 104) and compared to the updated schema (step 106). An update command to update the database schema and records of the associated backup database is then generated. The update command includes the changes for the data records to accord with the new updated database schema along with an identification of the version of the schema being sent in the update command (step 108). The schema version is provided so that future data restored to the portable electronic device 22 using an unsupported schema version can be detected by the portable electronic device 22. Next, the records of the database 42 are updated by deleting the one of the e-mail fields that is obsolete from each of the records (Step 110) and storing the e-mail records in the database 42. It will be understood that each of the records of the database 42 therefore conforms to the new database structure as defined by the updated database schema. The update command is then transmitted to the synchronization server 30 (step 112).

Upon receipt of the update command at the synchronization server 30 (step 114), the data records of the corresponding backup database 36 are retrieved (step 116), and each data record is updated by deleting the one of the e-mail fields that is obsolete (step 118). After deleting the one of the e-mail fields that is obsolete, the data records are stored in the backup database 36 and the updated database schema for the backup database 36 is stored in the data dictionary in association with the database 36 (step 120).

Another example will now be described with continued reference to FIG. 4. In the present example, a field is added to the records in the database 42 for synchronization. One of the e-mail fields in the records of an address database (for example, Contacts records) is added to allow a further e-mail field to be specified and is therefore added to synchronization. The updated schema is received in the form of an XML file that has one additional field defined therein as compared to the previous schema for the database 42 (step 100). The updated schema includes the updated database structure including field data for the new field being added such as the field name, the field tag identification number, the data type, the maximum supported field length, whether or not the field is a key field, and an indication that the field is supported for synchronization. The updated schema also includes a mapping between the field tags of the updated schema and the field tags of the Messaging Application Programming Interface (MAPI). Thus, a mapping between the field tag of the added field and the MAPI field tag is included. The updated database schema for the database 42 is stored in the data dictionary in association with the database 42 (step 102). The previous schema for the address database 42 is then retrieved from the persistent storage device 52 (step 104) and compared to the updated schema (step 106). An update command to update the database schema of the associated database is generated from the comparison between the updated schema and the previous schema. The update command includes the information for the new field being added, including the field name, the field tag identification number, the data type, the maximum supported field length, whether or not the field is a key field, and an indication that the field is supported for synchronization (step 108). The update command also includes the mapping of the field tags of the updated schema to the field tags of the MAPI. Since a new field is added, the records of the database 42 are not changed. Instead, the data records can be changed later by entering data into the new field defined in the updated database schema, for example, by user input. The update command, including the mapping of the field tags of the updated schema to the field tags of the MAPI, is then transmitted to the synchronization server 30 (step 112).

Upon receipt of the update command at the synchronization server 30 (step 114), the updated database schema for the backup database 36 is stored in the data dictionary in association with the database 36 (step 120). With the new field stored in the database schema, field data can be added to the data record, for example, after receipt from the portable electronic device 22 during a backup procedure. Again, the records are not retrieved or updated as a new field is added. The records can be changed later by adding data to the new field. As indicated above, the update command includes the mapping of the field tags of the updated schema to the field tags of the MAPI.

Yet another example will now be described with continued reference to FIG. 4. In the present example, a field of the records in the database 42 is modified for synchronization. For the purpose of the present example, one of the fields of the records is modified by changing the data type from integers to strings. The updated schema is received in the form of an XML file that includes field data for the modified field. This field data includes the data type as a string, in contrast to the previous schema for the database 42, which indicated the data type as an integer (step 100). The updated schema includes the updated database structure and a mapping between the field tags of the updated schema and the field tags of the Messaging Application Programming Interface (MAPI). The updated database schema for the database 42 is stored in the data dictionary in association with the database 42 (step 102). The previous schema for the address database 42 is then retrieved from the persistent storage device 52 (step 104) and compared to the updated schema (step 106). An update command to update the database schema of the associated database is generated from the comparison between the updated schema and the previous schema. The update command includes the field information for the modified field to accord with the new updated database schema (step 108). In the present example, the update command includes the data type of the modified field. Next, the records of the database 42 are updated by deleting the modified field from each of the records (Step 110). New data can later be added to the modified field of each data record by adding data to the modified field in accordance with the updated database schema. The update command including the mapping of the field tags of the updated schema to the field tags of the MAPI, is then transmitted to the synchronization server 30 (step 112).

Upon receipt of the update command at the synchronization server 30 (step 114), the data records of the corresponding backup database 36 are retrieved (step 116) and each data record is updated by deleting the modified field (step 118). After deleting the modified field, the data records are stored in the backup database 36 and the updated database schema for the backup database 36 is stored in the data dictionary in association with the database 36 (step 120). With the modified field stored in the database schema, field data can be added to the data record, for example, after receipt from the portable electronic device 22 during a backup procedure.

Thus, according to one aspect, there is provided a method of updating a database, including data records, to accord with an updated schema. The method includes obtaining at a portable electronic device the updated schema associated with the database. The data records are updated by deleting a field from each of the data records if the field is deleted in the updated schema. An update command is transmitted from the portable electronic device for updating the database schema for a corresponding backup database at a server.

According to another aspect, there is provided a computer-readable medium having computer-readable code embodied therein for: obtaining at a portable electronic device an updated schema associated with a database including data records; if a field is deleted in the updated schema, updating the data records by deleting the field from each of the data records; and transmitting an update command from the portable electronic device for updating the database schema for a corresponding backup database at a server.

According to still another aspect, there is provided a portable electronic device including an input for receiving an updated schema associated with a database, a memory for storing data records in the database, a processor connected to the input and the memory for updating data records of the database based on the updated schema by deleting a field from each of the data records if the field is deleted in the updated schema, and a transmitter connected to the processor for transmitting an update command from the portable electronic device for updating a database schema for a corresponding backup database at a server.

Advantageously, a database schema is updated dynamically. Aspects of embodiments described herein provide for the comparison of new schema with old schema for determination of the changes made to a database schema. These changes are made at the portable electronic device and are transmitted from the portable electronic device to a server for updating backup records. Rather than invalidating previously backed-up data, the server uses schema change information to update the backup records by, for example, deleting fields from data records belonging to the database with the updated schema. In a further aspect, the schema for databases associated with mail store content includes a mapping between field identifications of the records of the portable electronic device and field identifications in MAPI (Messaging Application Programming Interface) for retrieval of data for new fields from a mail server.

While the embodiments described herein are directed to particular implementations of schema updating for synchronizing databases connected by wireless interface, it will be understood that modifications and variations to this embodiment are within the sphere and scope of the present application. For example, in the above-described example in which the field is modified, the field data type is changed from integers to strings. It will be appreciated that the field can be modified in many other ways. For example, the field name can be changed, the maximum supported length can be changed, and whether or not the field is considered to be a key field can be changed. These changes need not result in the deletion of content of the fields of each of the data records as in the above-described example. It is also possible that the electronic device determines the changes made to the schema and for certain changes, modifies the data of the field for each data record. For example, with a simple change of a field definition from a non-terminated string to a terminated string with a null terminator, the portable electronic device can add a terminating character to the data field for each data record and issue an update command to the server to do the same.

It will be understood that the portable electronic device 22 is not limited to three databases as any suitable number of databases is possible. Similarly, the communication system 20 may include any suitable number of databases. It will also be understood that the steps described hereinabove are not limited to the order in which they are described. The steps described can be performed in any suitable order as may occur to those skilled in the art.

Many other modifications and variations may occur to those skilled in the art. All such modifications and variations are believed to be within the sphere and scope of the present application.

The invention claimed is:

1. A method of updating and backing up a database at a portable electronic device, including data records, to accord with an updated schema, the method comprising:
   obtaining at said a portable electronic device the updated schema associated with the database;
   comparing at said portable electronic device the updated schema with a previous schema associated with the database, to determine database schema changes, wherein said data records are stored in said database according to said previous schema;
   changing the data records at said portable electronic device by deleting a field from each of the data records if the field is deleted in the updated schema;
   generating an update command at said portable electronic device based on said comparing, when the updated schema differs from said previous schema, said update command comprising said database schema changes which enables a backup database stored at a server to be updated to accord with the updated schema; and
   transmitting said update command from said portable electronic device to said server.

2. The method of updating and backing up a database according to claim 1, further comprising changing the data records, if a field is modified in the updated schema, by one of deleting data from a modified field for each of the data records and modifying field data for each of the data records.

3. The method of updating and backing up a database according to claim 1, wherein said previous schema is stored in memory at the portable electronic device.

4. The method of updating and backing up a database according to claim 1, wherein said transmitting an update command comprises transmitting an update command if a field is deleted in the updated schema.

5. The method of updating and backing up a database according to claim 4, wherein transmitting an update command comprises transmitting an update command if a field is modified in the updated schema.

6. The method of updating and backing up a database according to claim 1, wherein said obtaining at a portable electronic device the updated schema includes obtaining a mapping between field tags of the updated schema and field tags in a messaging application programming interface (MAPI).

7. The method of updating and backing up a database according to claim 1, comprising storing said updated schema at the portable electronic device.

8. The method of updating and backing up a database according to claim 1, further comprising:
   receiving at the server the update command comprising database schema changes from the portable electronic device for updating the database schema for the backup database; and
   changing the backup data records by deleting a field from each of the backup data records if the field is deleted in the updated schema.

9. The method of updating and backing up a database according to claim 8 comprising changing the backup data records, if a field is modified in the updated schema, by one of: deleting data from the modified field for each of the backup data records and modifying the field data for each of the backup data records.

10. The method of updating and backing up a database according to claim 8, comprising storing said updated schema in association with said backup database.

11. A computer program product, comprising a computer usable medium having a computer-readable program code adapted to be executed to implement a method for updating and backing up a database at a portable electronic device, including data records, to accord with an updated schema, the method comprising:
   obtaining at a portable electronic device the updated schema associated with a database;
   comparing at said portable electronic device the updated schema with a previous schema associated with the database, to determine database schema changes, wherein said data records are stored in said database according to said previous schema;
   changing the data records at said portable electronic device by deleting a field from each of the data records if the field is deleted in the updated schema;
   generating an update command at said portable electronic device based on said comparing, when the updated schema differs from said previous schema, said update command comprising said database schema changes which enables a backup database stored at a server to be updated to accord with the updated schema; and
   transmitting said update command from said portable electronic device to said server.

12. A portable electronic device comprising:
   an input enabled to receive an updated schema associated with a database;
   a memory enabled to store data records in said database;
   a processor, connected to the input and the memory, said processor enabled to:
      compare the updated schema with a previous schema associated with the database, to determine database schema changes, wherein said data records are stored in said database according to said previous schema;

change the data records deleting a field from each of the data records if the field is deleted in the updated schema;

generating an update command based on said comparing, when the updated schema differs from said previous schema, said update command comprising said database schema changes which enables a backup database stored at a server to be updated to accord with the updated schema; and a transmitter, connected to the processor, said transmitter enabled to transmit said update command to said server.

13. The portable electronic device according to claim 12 wherein said input comprises at least one of a user input device, a receiver, and a connector.

14. A method of updating and backing up a database at a portable electronic device, said database comprising data records, to accord with an updated schema, the method comprising:

obtaining at said portable electronic device the updated schema associated with the database;

comparing at said portable electronic device the updated schema with a previous schema associated with the database, to determine database schema changes, wherein said data records are stored in said database according to said previous schema;

changing the data records by:

deleting a field from each of the data records, if said database schema changes comprise a deletion of said first field of the data records;

modifying field data stored in a second field in each of the data records, if said database schema changes comprise a modification of said second field of the data records; and adding a new field in each of the data records, if said database schema changes comprise an addition of said new field of the data records;

generating an update command at said portable electronic device based on said comparing, when the updated schema differs from said previous schema, said update command comprising said database schema changes which enables a backup database stored at a server to be updated to accord with the updated schema; and transmitting said update command from said portable electronic device to the server.

15. The method according to claim 14, wherein said modifying field data stored in said field of the data records comprises adding, deleting or modifying the data populating the field.

16. The method according to claim 14, wherein said previous schema is stored in memory at the portable electronic device.

17. The method according to claim 4, wherein said obtaining the updated schema comprises obtaining a mapping between field tags of the updated schema and field tags in a messaging application programming interface (MAPI).

18. The method according to claim 17, wherein said update command further comprises said mapping between field tags of the updated schema and field tags in said messaging application programming interface (MAPI).

19. The method according to claim 14, further comprising storing the updated schema at said portable electronic device.

20. The method according to claim 14, further comprising:

receiving at the server, the update command from the portable electronic device for updating the database schema for said backup database; and changing backup data records according to said update command.

21. The method according to claim 20, wherein if said update command comprises a mapping between field tags of the updated schema and field tags in a messaging application programming interface (MAPI), said receiving said update command from the portable electronic device at said server comprises receiving said mapping between the field tags of said updated schema and the field tags in the MAPI.

22. The method according to claim 20, further comprising storing the updated schema in association with said backup database.

23. A computer program product, comprising a computer usable medium having a computer-readable program code adapted to be executed to implement a method for updating and backing up a database, at a portable electronic device, said database comprising data records, to accord with an updated schema, said method comprising:

obtaining at said portable electronic device the updated schema associated with the database;

comparing at said portable electronic device the updated schema with a previous schema associated with the database, to determine database schema changes, wherein said data records are stored in said database according to said previous schema;

changing the data records by:

deleting a field from each of the data records, if said database schema changes comprise a deletion of said first field of the data records;

modifying field data stored in a second field in each of the data records, if said database schema changes comprise a modification of said second field of the data records; and adding a new field in each of the data records, if said database schema changes comprise an addition of said new field of the data records; and generating an update command at said portable electronic device based on said comparing, when the updated schema differs from said previous schema, said update command comprising said database schema changes which enables a backup database stored at a server to be updated, to accord with the updated schema; and transmitting said update command from said portable electronic device to the server.

24. A portable electronic device comprising:

an input enabled to receive an updated database schema associated with a database;

a memory enabled to store data records in said database;

a processor for executing computer-readable program code embodied in a computer usable medium of the portable electronic device, said computer-readable program code for causing the portable electronic device to:

obtain the updated schema associated with the database;

compare the updated schema with a previous schema associated with the database, to determine database schema changes, wherein said data records are stored in said database according to said previous schema;

change the data records by:

deleting a field from each of the data records, if said database schema changes comprise a deletion of said first field of the data records;

modifying field data stored in a second field in each of the data records, if said database schema changes comprise a modification of said second field of the data records; and adding a new field in each of the data records, if said database schema changes comprise an addition of said new field of the data records; and generating an update command based on said comparing, when the updated schema differs from said previous schema, said update command comprising said database schema changes which enables a backup database stored at a server to be updated to accord with the updated schema; and transmitting said update command from said portable electronic device to the server.

25. The portable electronic device according to claim 24 wherein said input comprises at least one of a user input device, a receiver, and a connector.

26. A method carried out at a server for updating a backup database comprising backup data records stored on the server, to accord with an updated schema operated by a portable electronic device, the method comprising:

receiving an update command from the portable electronic device, said update command enables updating a database schema for the backup database, said update command determined at the portable electronic device by comparing an updated schema with a previous schema associated with a database at the portable electronic device, data records at the portable electronic device updated based on the comparison, wherein said data records are stored in said database according to said previous schema; and changing the backup data records according to the update command by:

deleting a first field from each of the backup data records if the update command indicates that an associated first field is deleted in the updated schema operated by the portable electronic device, modifying a second field in each of the backup data records, if the update command indicates that an associated second field of a data record stored in the database at the portable electronic device was previously modified when the updated database schema was applied to said database; and adding a new field in each of the backup data records, if the update command indicates that an associated field of a data record stored in the database at the portable electronic device was previously added when the updated database schema was applied to said database.

* * * * *